Figure 1:
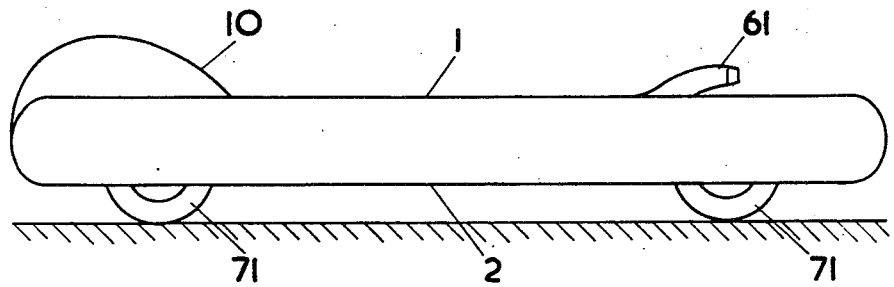

Aug. 31, 1965    R. A. SHAW    3,203,645
AIRBORNE VEHICLES
Filed Sept. 21, 1960    3 Sheets-Sheet 1

Ronald A. Shaw
Inventor

By
Cameron, Kerkam & Sutton
Attorneys

Ronald A. Shaw
Inventor

United States Patent Office 3,203,645
Patented Aug. 31, 1965

1

3,203,645
AIRBORNE VEHICLES
Ronald Andrew Shaw, Cobbes, Felden, Hemel Hempstead, England, assignor to National Research Development Corporation, London, England
Filed Sept. 21, 1960, Ser. No. 57,455
Claims priority, application Great Britain, Sept. 25, 1959, 32,752/59
8 Claims. (Cl. 244—23)

This invention relates to an airborne vehicle capable of flight while supported by the jet reaction of one or more downwardly discharged fluid streams, rather than by the aerodynamic lift afforded by wings. A general object of the invention is the provision of a vehicle which can be operated in a number of different roles, namely, on the ground as a more or less conventional road vehicle, and in flight, both close to the ground when advantage can be taken of the ground cushion effect of the fluid streams, and in free flight, i.e., at altitudes such that the ground cushion effect is negligible.

The power requirements for operation in these various roles are widely different; thus it may be expected that for free flight outside the ground cushion, there will be required something like twenty times the power used for road operation, while for flight in the ground cushion the power requirement might be one quarter of that required in free flight. Moreover the endurance required in the various roles will be different; in a practical case, it may be expected that during more than half of its total operating time, the vehicle will be on the ground, while the time spent in the ground cushion will be considerably less, and the time spent in free flight outside the ground cushion will be a very small proportion of the whole. A further object of the invention is thus the provision of a power system which will operate as economically as possible having regard to the considerations noted above.

According to the invention, an airborne vehicle comprises one or more fans mounted thereon with their axes substantially vertical, the or each fan being arranged to draw in air and to discharge it as a downwardly directed stream through an aperture in the undersurface of the vehicle so as to afford upthrust on the latter, and means for diverting the stream or streams to one or more nozzles so shaped and arranged that the air is discharged therethrough in a downwards direction as a curtain extending continuously around the periphery of the vehicle.

It is a feature of the invention that, to allow for the varying power requirements of the vehicle, two power plants are provided, one driving the fan or fans when the vehicle is in free flight, and the other having a smaller power output and driving the fan or fans when the vehicle is in flight within the ground cushion. The smaller power plant may also be used for driving the wheels of the vehicle when on the ground, and provision may be made whereby either power plant can take over the role of the other.

According to yet another feature of the invention, the or each fan comprises a row of fan rotor blades and a row of turbine rotor blades in driving connection therewith and the two power plants are connected to drive compressors, either of which can be connected to supply air to drive the turbine rotor blades and hence the fan blades. The compressor of the smaller plant may also be connected to supply air to drive an air turbine in driving connection with the wheels.

One embodiment of the invention will now be described by way of example with reference to the accompanying diagrammatic drawings which show a vehicle which is capable of operation on roads, and also of flight, both within the ground cushion at a height of a few feet for travel over rough ground, marsh and water, and at greater altitudes for limited periods in order to clear obstructions.

Figure 2:
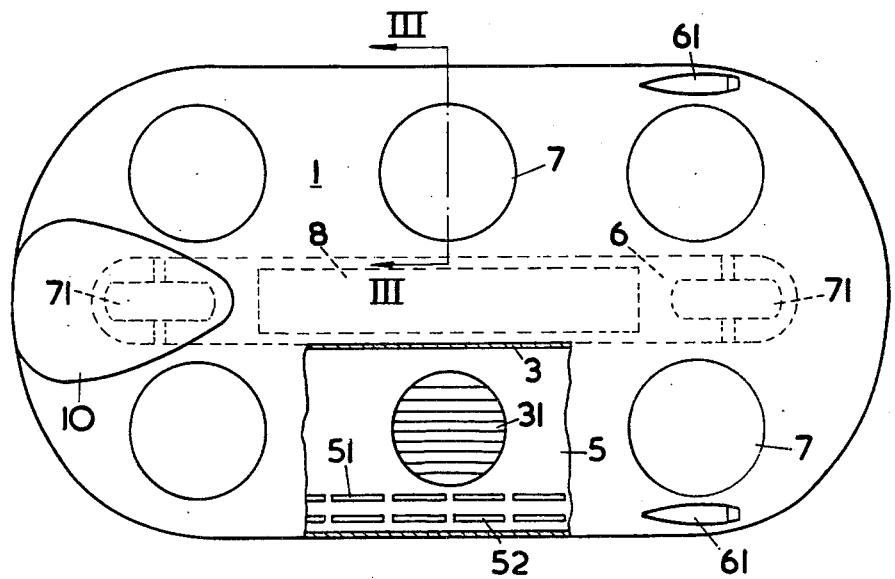
Figure 3:
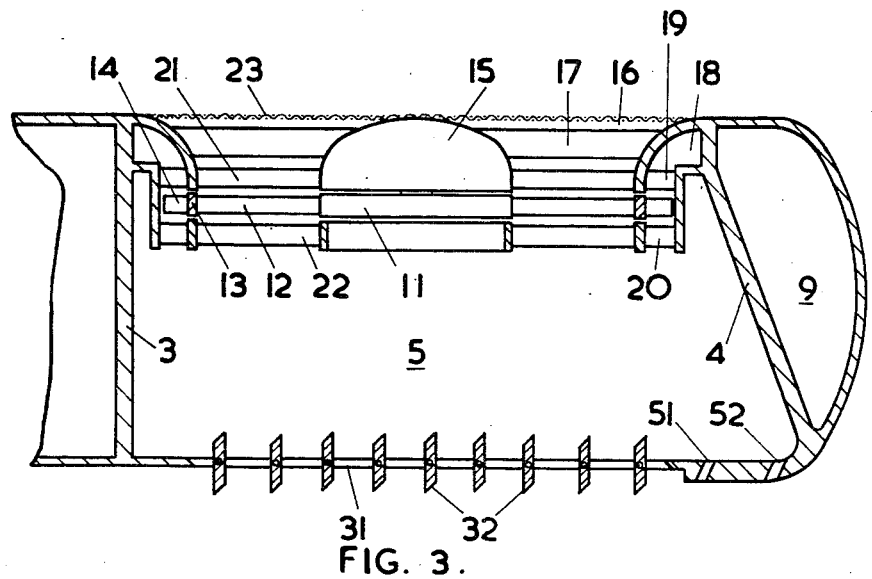
Figure 4:
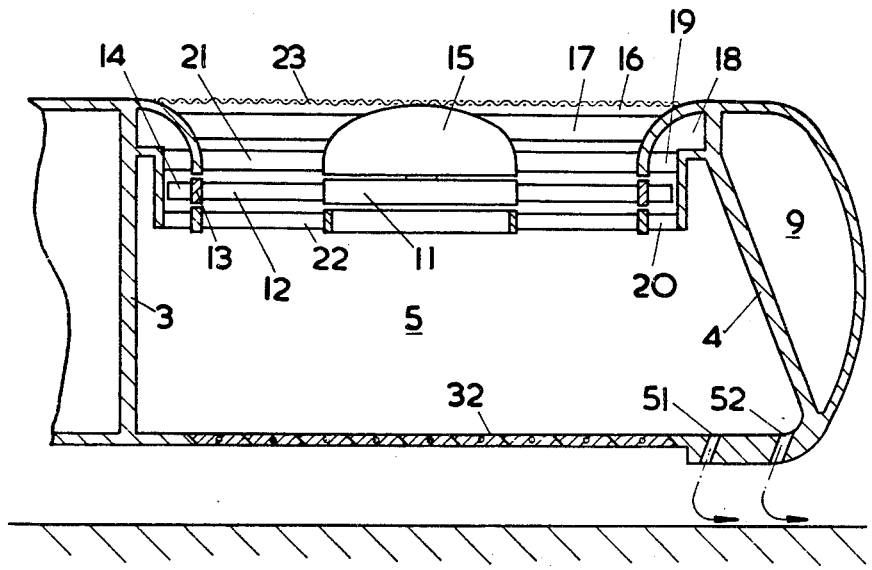
Figure 5:
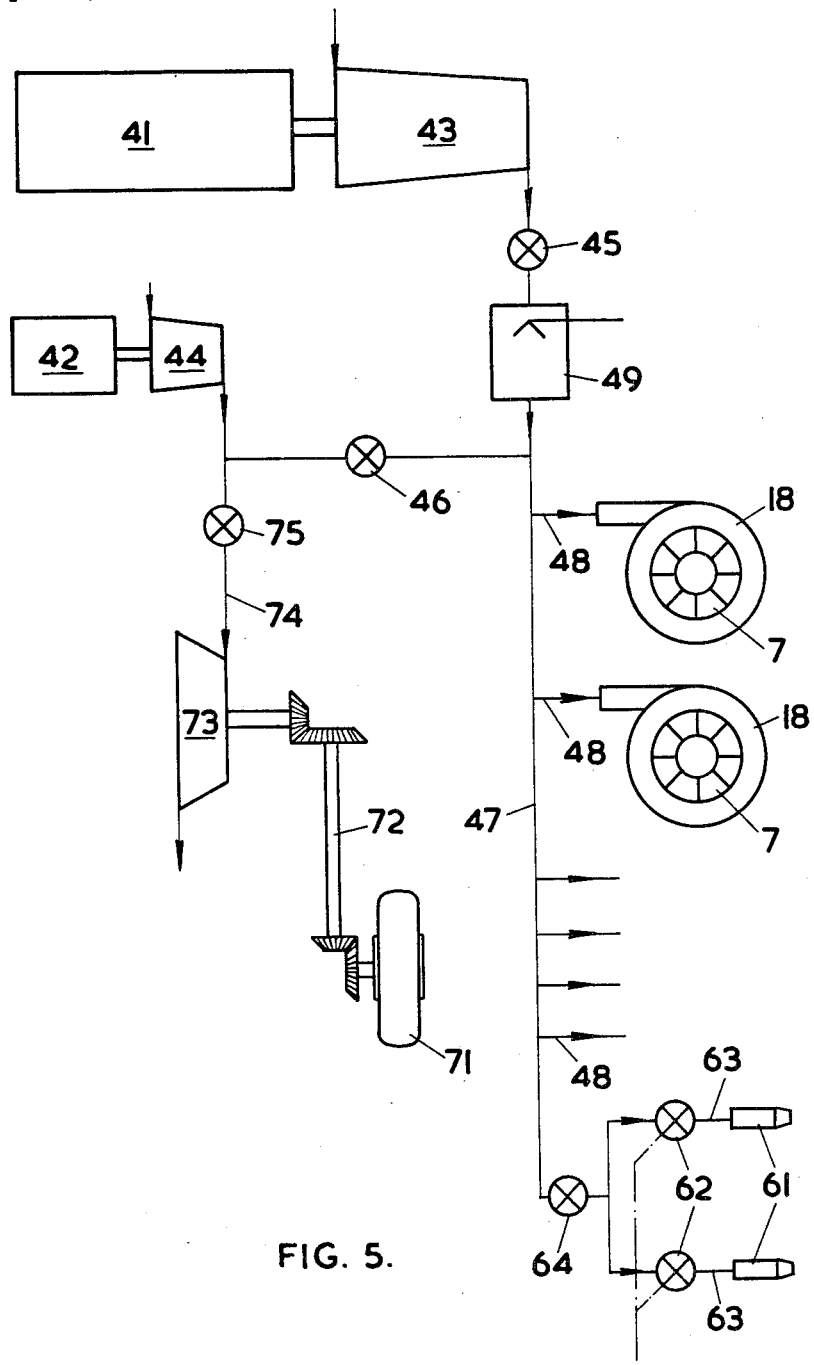

In the drawings:
FIGURE 1 is a side view of the vehicle.
FIGURE 2 is a plan view, part of the upper surface being shown as broken away to reveal the interior construction.
FIGURES 3 and 4 are sectional views taken on the line III—III in FIGURE 2 showing the vehicle in free flight and in flight within the ground cushion respectively.
FIGURE 5 is a schematic diagram of the power plant and the associated ducting and drive arrangement of the vehicle.

The structure of the vehicle consists essentially of a generally oval platform having upper and lower decks 1, 2 constituting the top and under-surfaces of the vehicle, and inner and outer side walls 3, 4, these decks and walls defining a plenum chamber 5 extending around the vehicle and surrounding a central well 6 enclosed by inner wall 3. Mounted in the upper deck are six axial flow fans 7 symmetrically spaced over the planform of the vehicle.

As shown in FIGURE 3, each fan has a rotor 11 mounted with its axis substantially vertical and a row of axial flow fan rotor blades 12 mounted thereon, the fan blade tips being connected by a shroud ring 13 with a row of axial flow turbine rotor blades 14 carried on its outer surface. The fan rotor is supported in bearings carried in a fairing 15 supported centrally within the fan intake 16 by struts 17. The turbine blades are associated with an inlet volume 18 and turbine inlet nozzle vanes 19, while there is a further row of axial flow turbine stator blades 20 downstream of the rotor blades 14. Rows of axial flow fan stator blades 21, 22 are provided upstream and downstream of the fan rotor blades 12.

Similar fans are disclosed in prior British patent specifications Nos. 834,800 and 839,977, corresponding to U.S. Patents Nos. 2,940,689 and 2,939,649, respectively.

In operation, when working fluid is supplied to inlet volute 18, the fan draws in air through the intake 16, and the streams from the fan and turbine blades are discharged downwardly through apertures 31 in the lower deck 2. As will be apparent from FIGURES 2–4, each of the apertures 31 is aligned axially with one of the fans 7 and is of an area substantially equal to that of the fan outlet. Across each aperture extends a series of pivoted slats 32 which can be turned from the position shown in FIGURE 3 in which they lie edge on to the stream to the position shown in FIGURE 4 in which they close the aperture.

Each intake 16 has a well rounded bell mouth which is protected by a gauze screen 23, and it may also be provided with hinged or sliding louvres or the like (not shown) capable of being opened and closed.

The vehicle is powered by two gas turbine power plants which are accommodated in an engine bay indicated at 8 in the central well 6. The details of the engines and the associated ducting layout are not shown in FIGURES 1–4 but reference is made to the schematic view of FIGURE 5. One of the two power plants 41 is of considerably greater power output than the other plant 42, and each plant is connected to drive an auxiliary compressor 43, 44. The outlets of these compressors are both connected through non-return valves 45, 46 to a common manifold 47 from which branches 48 lead to the inlet volutes 18 of the fans 7 (only two of fans shown in FIGURE 5. The air supply from compressor 42 passes through a combustion chamber 49.

In an alternative arrangement, the turbine rotor blades are of the impulse design, and the turbine inlet nozzles of the partial admission type, the compressors being connected to supply separate sectors of the turbine nozzle of each fan.

For flight outside the ground cushion, the larger engine 41 is in operation to drive its compressor 43 which supplies air to the turbine blades whereby the fans are driven. The slats 32 are set so that the apertures 31 in the vehicle undersurface are open, and the air from the fan and turbine blades is discharged as downwardly directed streams which afford sufficient upthrust to support the vehicle. If necessary, fuel may be burnt in combustion chamber 49 to produce extra power.

For flight within the ground cushion, the larger engine 41 is shut down and the smaller engine 42 brought in use to drive compressor 44 which supplies air to drive the fans at a lower speed. The slats 32 are turned to close apertures 31 as shown in FIGURE 4, so that the air from the fans is trapped in the plenum chamber 5, and diverted to an inner and outer series of elongated slot-like nozzles 51, 52 formed in the lower deck 2 outboard of the apertures 31 and opening out of the plenum chamber, the total flow area of these nozzles being approximately equal to the total flow area of the apertures 31. The outlets of each series of nozzles are continuous with one another and form a long narrow nozzle extending around the periphery of the vehicle, and they are directed downwardly and somewhat inwardly towards the centre of the vehicle. The air is therefore discharged as continuous curtains extending around the vehicle periphery, and provided the vehicle is close the ground as shown in FIGURE 4, these curtains produce lift greatly in excess of the upwards component of jet reaction of the air stream, the lift increasing as the ground clearance diminishes. The principles involved have been described elsewhere and will not be detailed here.

Forward propulsion in flight is afforded by a pair of rearwardly directed jet nozzles 61 on opposite sides of the vehicle which are connected to the manifold 47 to receive air from the compressors. Directional control can be achieved by differential operation of linked valves 62 in the branches 63 leading to these nozzles (see FIGURE 5), or alternatively, by differential adjustment of the jet nozzle areas. When in free flight, forward propulsion can also be achieved by tilting the vehicle so that the air streams from the fans are discharged with a rearward component of motion.

For ground operation, e.g. on roads, the vehicle is further provided with a pair of wheels 71 disposed in tandem on the vehicle centre-line and partly housed within the central bay 6. One or both of the wheels is connected through a transmission 72 to be driven by an air turbine 73 to which air from the compressor 44 may be supplied through branch 74 and valve 75. Under these conditions it is intended that some of the air from compressor 44 shall still be supplied to the fans to supply the peripheral nozzles 51, 52 and afford a small amount of lift and maintain lateral balance. The supply of air to jet nozzles 61 can however be cut off by valve 64.

The edge of the platform is formed as a hollow chamber 9 which will afford sufficient buoyancy for the vehicle to float.

The vehicle is shown as provided with a cabin 10 at its forward end for accommodating the crew.

The slats 32 could extend transversely across the apertures 31 rather than in a fore and aft direction as shown, and in this case provision can be made for turning them to positions intermediate the positions shown in FIGURES 3 and 4 so that the air streams discharged therefrom have a rearward component of motion for forward propulsion of the vehicle in free flight or a forward component for braking, without change of attitude.

The use of separate plants for flight in different roles makes it possible to operate each close to its design point for maximum efficiency. However in an emergency, e.g., engine failure, either plant could take over from the other to maintain lift. Further, for overload conditions both plants might be operated together.

I claim:

1. An airborne vehicle capable of operating both close to the ground within the ground effect cushion and in free flight outside said cushion comprising at least one fan mounted thereon with its axis substantially vertical, and having an undersurface formed with an aperture and with nozzle means separate from and outboard of said aperture and extending around the periphery of the vehicle, said aperture being aligned with said fan and having an area substantially equal to that of the fan outlet, said fan being arranged to draw in air and to discharge sufficient air through said aperture as a downwardly directed stream to afford upthrust on the vehicle when the vehicle is in free flight, and means for diverting said stream from said aperture to said nozzle means when the vehicle is operating within the ground effect cushion, said nozzle means being so shaped and arranged that the air is discharged therethrough in a downwards direction as a curtain extending continuously around the periphery of the vehicle.

2. An airborne vehicle capable of operating both close to the ground within the ground effect cushion and in free flight outside said cushion comprising at least one fan mounted thereon with its axis substantially vertical, and having an undersurface formed with an aperture aligned with the fan and having an area substantially equal to that of the fan outlet, nozzle means in said undersurface separate from and outboard of said aperture and extending around the pheriphery of the vehicle, means defining a plenum chamber within the vehicle between the fan and the undersurface, the fan being arranged to draw in air and discharge sufficient air through said plenum chamber and aperture as a downwardly directed stream to afford upthrust on the vehicle when the vehicle is in free flight, said nozzle means being in communication with the plenum chamber and shaped and arranged to discharge a stream in a downwards direction as a curtain extending continuously around the periphery of the vehicle, and means for closing said aperture when the vehicle is operating within the ground effect cushion whereby the stream discharged from the fan is diverted to said nozzle means.

3. An airborne vehicle capable of operating both close to the ground within the ground effect cushion and in free flight outside said cushion comprising at least one fan mounted thereon with its axis substantially vertical, and having an undersurface formed with an aperture and with nozzle means separate from and outboard of said aperture and extending around the periphery of the vehicle, said aperture being aligned with said fan and having an area substantially equal to that of the fan outlet, said fan being arranged to draw in air and to discharge sufficient air through said aperture as a downwardly directed stream to afford upthrust on the vehicle when the vehicle is in free flight, means for diverting said stream from said aperture to said nozzle means when the vehicle is operating within the ground effect cushion, said nozzle means being so shaped and arranged that the air is discharged therethrough in a downwards direction as a curtain extending continuously around the periphery of the vehicle, two power plants, one having a smaller power output than the other, the power plant of smaller output being adapted for use when the vehicle is in flight within the ground effect cushion and the other power plant being adapted for use when the vehicle is in free flight outside said cushion, and means operable to establish a driving connection between either of said two power plants and the fan.

4. A vehicle according to claim 3 wherein the fan comprises a row of fan rotor blades and a row of turbine rotor blades in driving connection therewith, and further comprising two compressors, one driven by each of said power plants, and duct means for supplying air from said compressors to said fan to drive said turbine rotor blades.

5. An airborne vehicle capable of operating both close to the ground within the ground effect cushion and in free flight outside said cushion comprising a body having upper and lower decks and a peripheral side wall, a plurality of fans mounted in the upper deck with their axes substantially vertical, a like plurality of apertures in the lower deck aligned with said fans, means including said peripheral wall and lower deck defining a plenum chamber within the vehicle body into which all of said fans discharge, said fans being arranged to draw in air and discharge it into said plenum chamber and thence through said apertures as downwardly directed streams so as to afford upthrust on the vehicle, nozzle means formed in the lower deck separate from and outboard of said apertures and extending around the periphery of the vehicle adjacent said peripheral wall, said nozzle means being in communication with the plenum chamber and so shaped and arranged as to discharge air in a downwards direction in the form of a curtain extending substantially continuously around the periphery of the vehicle, and means for closing said apertures so as to divert the streams discharged from said fans to said nozzle means.

6. An airborne vehicle comprising a plurality of fans mounted thereon with their axes substantially vertical and spaced over the planform of the vehicle, and having an undersurface formed with a plurality of apertures aligned with said fans, nozzle means in said undersurface separate from and outboard of said apertures and extending around the periphery of the vehicle, means defining a plenum chamber within the vehicle between said fans and the undersurface into which all of said fans discharge, said fans being arranged to draw in air and discharge it through said plenum chamber and apertures as a plurality of downwardly directed streams so as to afford upthrust on the vehicle, said nozzle means being in communication with the plenum chamber and comprising a plurality of discharge apertures so shaped and arranged as to discharge streams in a downwards direction in the form of a curtain extending continuously around the periphery of the vehicle, and means for closing said first-named apertures whereby the streams discharged from the fans are diverted to said nozzle means.

7. An airborne vehicle capable of operating both close to the ground within the ground effect cushion and in free flight outside said cushion comprising at least one fan mounted thereon with its axis substantially vertical, and having an undersurface formed with an aperture and with nozzle means separate from and outboard of said aperture and extending around the periphery of the vehicle, said fan being arranged to draw in air and to discharge it through said aperture as a downwardly directed stream so as to afford upthrust on the vehicle, means for diverting said stream from said aperture to said nozzle means, said nozzle means being so shaped and arranged that the air is discharged therethrough in a downwards direction as a curtain extending continuously around the periphery of the vehicle, two power plants, one having a smaller output than the other, the power plant of smaller output being adapted for use when the vehicle is in flight within the ground effect cushion and the other power plant being adapted for use when the vehicle is in free flight outside said cushion, means operable to establish a driving connection between either of said two power plants and the fan, at least one wheel arranged to support the vehicle on the ground, and means operable to establish a driving connection between the power plant of smaller output and the wheel.

8. An airborne vehicle capable of operating both close to the ground within the ground effect cushion and in free flight outside said cushion, comprising at least one fan mounted thereon with its axis substantially vertical, and having an undersurface formed with an aperture and with nozzle means separate from and outboard of said aperture and extending around the periphery of the vehicle, said fan being arranged to draw in air and to discharge it through said aperture as a downwardly directed stream so as to afford upthrust on the vehicle, said fan comprising a row of fan rotor blades and a row of turbine rotor blades in driving connection therewith, two compressors, one driven by each of said power plants, duct means for supplying air from said compressors to said fan to drive said turbine rotor blades, means for diverting said stream from said aperture to said nozzle means, said nozzle means being so shaped and arranged that the air is discharged therethrough in a downwards direction as a curtain extending continuously around the periphery of the vehicle, two power plants, one having a smaller power output than the other, the power plant of smaller output being adapted for use when the vehicle is in flight within the ground effect cushion and the other power plant being adapted for use when the vehicle is in free flight outside said cushion, means operable to establish a driving connection between either of said two power plants and the fan, at least one wheel arranged to support the vehicle on the ground, an air turbine in driving connection with said wheel, and duct means for supplying air from the compressor driven by the power plant of smaller output to said air turbine.

References Cited by the Examiner

UNITED STATES PATENTS

| 1,235,747 | 8/17 | Whitehall | 180—30 |
| 2,035,462 | 3/36 | Courtney | 180—30 X |
| 2,514,822 | 7/50 | Wolfe | 180—66 X |
| 2,544,606 | 3/51 | Mallory. | |
| 2,736,514 | 2/56 | Ross. | |
| 2,838,257 | 6/58 | Wibault. | |
| 2,939,649 | 6/60 | Shaw. | |
| 2,952,422 | 9/60 | Fletcher. | |
| 3,045,951 | 7/62 | Freeland | 244—23 |
| 3,050,146 | 8/62 | Crim | 180—7 |

FOREIGN PATENTS 219,133  11/58  Australia.

OTHER REFERENCES

Publication: "Flight." Sept. 11, 1959, pages 195, 196, 197, 198.

A. HARRY LEVY, *Primary Examiner.*

PHILIP ARNOLD, *Examiner.*